United States Patent [19]
O'Reilly et al.

[11] 3,876,223
[45] Apr. 8, 1975

[54] BASEBALL EQUIPMENT STORAGE AND TRANSPORTING CART

[76] Inventors: James J. O'Reilly; Agnes C. O'Reilly, both of 1232 Granville Rd., Newark, Ohio

[22] Filed: Dec. 20, 1973

[21] Appl. No.: 426,892

[52] U.S. Cl............................ 280/47.19; 280/47.26
[51] Int. Cl.............................................. B62b 1/16
[58] Field of Search........... 280/47.26, 47.19, 47.34, 280/47.35; 312/290; D12/33

[56] References Cited
UNITED STATES PATENTS

| | | | |
|---|---|---|---|
| 367,239 | 7/1887 | Roth | 312/290 X |
| 2,572,486 | 10/1951 | Isaac | 280/47.26 X |
| 3,010,775 | 11/1961 | Giovannelli | 312/290 X |
| 3,262,714 | 7/1966 | Langone | 312/290 X |

*Primary Examiner*—David Schonberg
*Assistant Examiner*—John A. Pekar
*Attorney, Agent, or Firm*—Marden S. Gordon

[57] ABSTRACT

A cart adapted for the storage and transportation of a multiplicity of items of baseball equipment such as baseball bats, baseballs, catcher's equipment, helmets and head gear, first aid kit, score book, resin bag, and other assorted necessities, the cart being of a box-like rectangular hollow configuration provided with handles for ease of carrying and wheels for ease of rolling and with the entire front and top surface of the cart opening to provide complete access to the interior of the cart and with the top forming a writing table when open, the overall size of the cart being such as to be easily placed into a standard automobile trunk.

5 Claims, 6 Drawing Figures

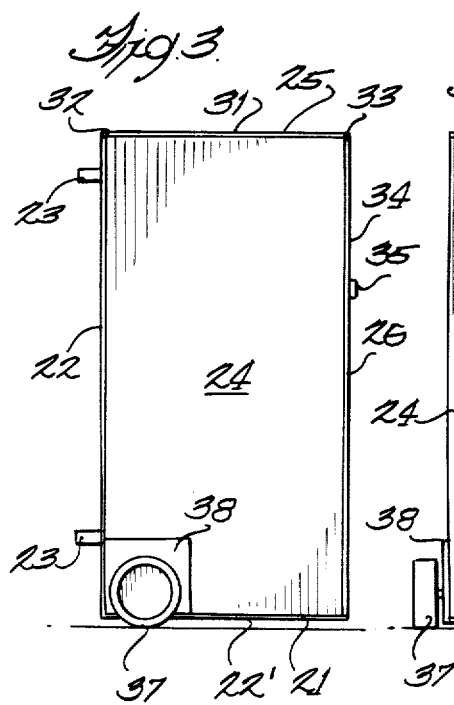
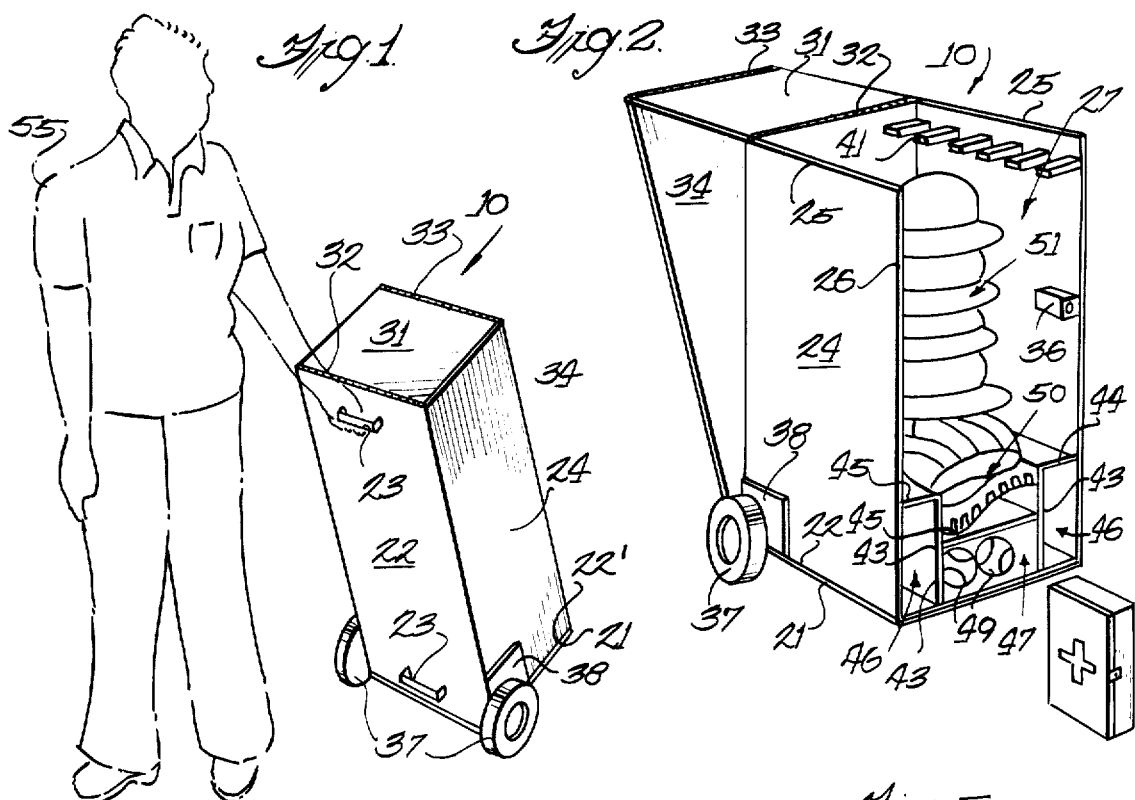
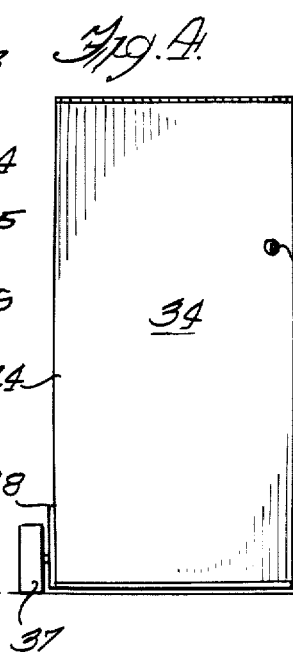
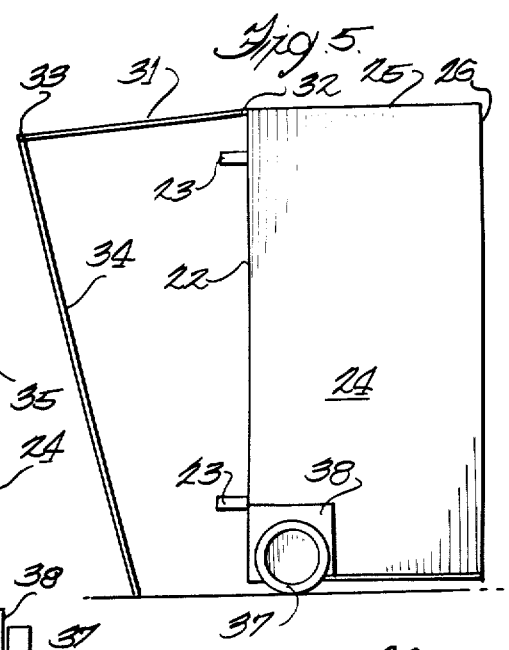
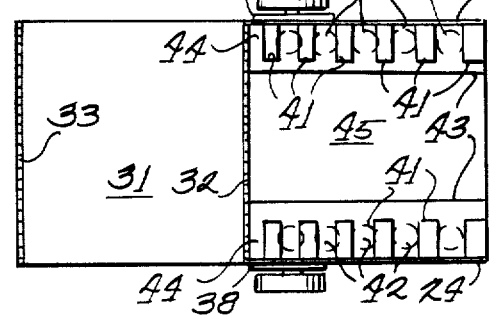

3,876,223

BASEBALL EQUIPMENT STORAGE AND TRANSPORTING CART

BACKGROUND AND SUMMARY OF THE INVENTION

This invention relates generally to carts and more particularly to a cart developed for the storage and transportation of baseball equipment.

While the prior art discloses carts of various types, shapes and configurations there is no cart disclosed which is specifically designed for the requirements of storage and transportation in an easy and expedient manner of baseball equipment such as that normally carried presently in duffle bags and the like by managers of baseball teams.

Accordingly the present invention provides a novel cart specifically adapted for the carrying of a multiplicity of items of baseball equipment including baseball bats, baseballs, catcher's equipment, helmets and head gear, score books, resin bags, first aid kit, and other assorted necessities in a neat and compact manner with such items being readily removed from and inserted into the cart.

It is a feature of the present invention to provide a cart of a compact size and configuration adapted to be readily carried or wheeled between locations and having a multiplicity of baseball equipment items stored therein in a manner readily retrieved therefrom for use thereof.

Among the features and advantages of the present invention is the provision of a baseball equipment storage and transporting cart which is relatively simple in its construction and which therefore may be readily manufactured at a relatively low cost and by simple manufacturing methods; one which is possessed of few parts and which therefore is unlikely to get out of order; one which is of a rugged and durable construction and which therefore may be guaranteed by the manufacturer to withstand rough usage; one which is easy to use and reliable and efficient in operation; one which is aesthetically pleasing and refined in appearance; and one which is otherwise well adapted to perform the services required of it.

Other features and advantages of this invention will be apparent during the course of the following description.

BRIEF DESCRIPTION OF THE DRAWINGS

In the accompanying drawings forming a part of this specification, and in which like reference characters are employed to designate like parts throughout the same;

FIG. 1 is a perspective view of a cart constructed in accordance with the present invention and illustrated as being pulled in a rolling manner behind an individual;

FIG. 2 is a perspective view of the cart in the open position;

FIG. 3 is a side elevational view of the cart;

FIG. 4 is a front elevational view of the cart;

FIG. 5 is a side elevational view of the cart in the open position; and

FIG. 6 is a top plan view of the open cart of FIG. 5.

DESCRIPTION OF THE PREFERRED EMBODIMENT

Referring now to the drawings in detail there is illustrated a preferred form of a baseball equipment storage and transporting cart constructed in accordance with the principles of the present invention and designated generally by the reference numeral 10 and which may be manufactured out of metal, wood, plastic, or any other suitable satisfactory material.

The cart 10 includes a housing having a bottom surface 21 with a skid plate 22' mounted thereon for protecting the same, a back surface 22 having a pair of U-shaped handles 23 secured thereto at the top and bottom edges thereof, and a pair of opposed side surfaces 24 each having a top edge 25 and a front edge 26. The surfaces 21, 22, and 24 define therebetween an equipment carrying and storage compartment 27. A top panel member 31 is provided having a piano hinge 32 extending along a back edge thereof and hingedly connecting the top panel to the top edge of back surface 22, the panel being of a size and configuration to completely close the top of compartment 27 by resting on top edges 25 of side members 24. The front edge of top panel 31 is provided with a transversely extending piano hinge 33 which is connected to the top edge of a front panel 34 which extends downwardly therefrom and is of a size and configuration to close the front opening of compartment 27 by resting on front edges 26 of side members 24 with the bottom edge of the front panel engaging the front edge of bottom surface 21.

A key operated lock 35 is provided in front panel 34 adjacent a side edge thereof and is adapted to cooperate with a lock mechanism 36 mounted to the interior surface of the adjacent side wall member 24 such that when the top panel 31 and front panel 34 are in the closed position the same may be securely locked by the lock 35 to prevent unauthorized entry into compartment 27 thus protecting the equipment stored therein.

Journaled for rotation adjacent the bottom edge of each side member 24 is one of a pair of wheels 37 with there being disposed intermediate the inner surface of each wheel and the adjacent exterior surface of each side wall member a plastic or metal plate 38 protecting the side wall member should, for some reason, the wheel tend to rub thereagainst.

It is to be noted that when the front panel 34 and top panel 31 are in the open position that the interior surface of top panel 31 is in a position facing upright and defines a writing surface adapted to support paper pads and the like thereon for writing thereon.

Disposed adjacent the top edge of each side wall member 24 and projecting outwardly from the interior surface thereof are a series of horizontally spaced apart transversely projecting support members 41 each defining slots therebetween of a size and configuration adapted to receive the handle portion of baseball bats 42 in hanging suspension therebetween adjacent the interior side walls of the side wall members. As seen in the drawings a total of ten baseball bats may be suspended in this manner, with five of the bats being suspended adjacent each side wall member.

Disposed intermediate the side wall members 24 and supported on bottom surface 21 are vertical partitions 43 having horizontal shelves 44 and 45 supported thereon so as to define a pair of compartments 46 adjacent each side wall member and a central compartment 47 intermediate the compartments 46, the compartment 47 being wider than compartments 46 but extending to a lesser vertical height than the compartments 46. One of compartments 46 may carry therein a first aid kit 48 with the other compartment 46 adapted to carry miscellaneous assorted necessities therein. Compartment 47 is of a size and configuration adapted for carrying baseballs 49 therein. Resting on shelf 45 is the catcher's equipment designated generally by reference numeral 50 with there resting on top thereof a plurality of baseballs hats designated generally by reference numeral 51.

As seen in FIG. 1 the cart may be wheeled along a supporting surface on the wheels 37 as pulled by top handle 23 by an individual 55, or alternatively the handles 23 may be used by individuals for ease in carrying the cart when it is not practical to use the wheels. Further, it is to be understood that the cart 10 is of a size and configuration adapted to be readily placed into a standard automobile trunk.

It is to be understood that the form of this invention herewith shown and described is to be taken as a preferred example of the same, and that this invention is not to be limited to the exact arrangement of parts shown in the accompanying drawings or described in this specification as various changes in the details of construction as to shape, size, and arrangement of parts may be resorted to without departing from the spirit of the invention, the scope of the novel concepts thereof, or the scope of the sub-joined claims.

Having thus described the invention, what is claimed is:

1. A cart adapted for the storage and transportation of baseball equipment comprising, in combination, a housing having a horizontal bottom surface, a vertical back wall surface, and a pair of opposed vertical side wall surfaces, said surfaces defining therebetween a compartment open at the front side and top side thereof; a top panel member having one edge hingedly connected to the top edge of said back wall surface with said top panel member being of a size and configuration to completely close said top end of said housing; a front panel member hinged along its top edge to a front edge of said top panel member with said front panel member being of a size and configuration adapted to completely close said front end of said compartment; lock means adapted to lock said front and top panel members in the closed position; a pair of wheels with each wheel disposed adjacent an associated side wall member and journaled by a suitable shaft thereto for rotation about said shaft in a plane substantially normal to the plane of the side wall members; a pair of vertically spaced apart handles mounted to said back surface, one handle mounted adjacent the top edge of said back surface with the second handle mounted adjacent the bottom edge of said back surface; means disposed inwardly of said compartment and adapted for retaining a multiplicity of baseball equipment items in a storage manner therein while providing ease of accessibility to such items, said means disposed inwardly of said compartment comprises a plurality of horizontally disposed spaced apart transversely projecting boss members each having one end affixed to an interior surface of an associated side wall member and projecting outwardly therefrom in a direction inwardly of said compartment and with each row of boss members disposed adjacent the top edge of said associated side wall member, said boss members defining slots therebetween of a width adapted to receive the handle portions of baseball bats therebetween to hangingly suspend such baseball bats in a vertical manner adjacent the interior surface of said associated side wall member, a pair of transversely spaced apart vertically extending partitions each having their bottom edge secured to the bottom surface of said housing and projecting upwardly therefrom, a first horizontally extending shelf interconnecting the approximate midpoints of said vertical partitions, a pair of second shelves each interconnecting the top edge of each vertical partition to adjacent points of associated adjacent side wall members, said first shelf defining with said partitions and said bottom surface a first compartment of a size and configuration adapted to receive baseballs therein, said second shelves forming with said associated partitions and associated side wall members and associated bottom surface a pair of transversely spaced apart compartments adapted to carry assorted baseball necessities therein.

2. A cart as set forth in claim 1 wherein one of said second compartments adjacent said side wall member is of a size and configuration adapted to receive a first aid kit therein.

3. A cart as set forth in claim 2 further comprising a wear plate mounted exterior of each side wall member in a position intermediate said side wall member and said associated wheel member to protect said side wall member against abuse by said wheel member during use of the cart.

4. A cart as set forth in claim 3 further comprising a skid plate affixed to the exterior surface of said bottom surface to protect said bottom surface against abuses during use of the cart.

5. A cart as set forth in claim 4 wherein said first horizontal shelf extending between said vertical partitions is of a size and configuration adapted to receive thereon catcher's equipment which, in turn, is adapted to have rested thereon a plurality of helmets and head gear.

* * * * *